United States Patent

Moratalla

[11] Patent Number: 5,702,508
[45] Date of Patent: Dec. 30, 1997

[54] CERAMIC DESICCANT DEVICE

[76] Inventor: Jose Moratalla, 3359 Lake Shore La., Clearwater, Fla. 34621

[21] Appl. No.: 590,391

[22] Filed: Jan. 25, 1996

[51] Int. Cl.$^6$ .......................... B01D 53/06; B01D 53/26
[52] U.S. Cl. .................. 96/118; 96/125; 96/126; 96/130; 96/140; 96/141; 96/146; 96/154; 55/523
[58] Field of Search ............. 55/523, 524; 95/113, 95/117–126; 96/108, 118, 123–130, 135, 139–144, 150, 153, 154

[56] References Cited

U.S. PATENT DOCUMENTS

| | | | |
|---|---|---|---|
| 2,038,071 | 4/1936 | Wilhelm | 96/118 |
| 3,112,184 | 11/1963 | Hollenbach | 55/523 X |
| 3,176,446 | 4/1965 | Siggelin | 96/118 |
| 3,607,133 | 9/1971 | Hirao et al. | 96/125 X |
| 3,844,737 | 10/1974 | Macriss et al. | 95/113 X |
| 3,865,924 | 2/1975 | Gidaspow et al. | 95/113 X |
| 3,925,021 | 12/1975 | Yoshino et al. | 96/118 |
| 4,012,206 | 3/1977 | Macriss et al. | 95/113 |
| 4,093,435 | 6/1978 | Marron et al. | 96/125 |
| 4,134,743 | 1/1979 | Macriss et al. | 95/113 |
| 4,276,071 | 6/1981 | Outland | 55/523 |
| 4,324,564 | 4/1982 | Oliker | 95/123 X |
| 4,343,631 | 8/1982 | Ciliberti | 55/523 X |
| 4,364,760 | 12/1982 | Higuchi et al. | 55/523 |
| 4,364,761 | 12/1982 | Berg et al. | 55/523 |
| 4,398,927 | 8/1983 | Asher et al. | 95/113 X |
| 4,402,717 | 9/1983 | Izumo et al. | 96/118 |
| 4,404,007 | 9/1983 | Tukao et al. | 55/523 |
| 4,417,908 | 11/1983 | Pitcher, Jr. | 55/523 |
| 4,452,612 | 6/1984 | Mattia | 95/113 X |
| 4,589,892 | 5/1986 | Leonard | 96/125 X |
| 4,594,860 | 6/1986 | Coellner et al. | 96/118 |
| 4,695,301 | 9/1987 | Okajima et al. | 55/523 |
| 4,718,926 | 1/1988 | Nakamoto et al. | 55/523 |
| 4,732,593 | 3/1988 | Kondo et al. | 55/523 |
| 4,769,053 | 9/1988 | Fischer, Jr. | 96/125 |
| 4,846,855 | 7/1989 | Tsujimoto | 95/113 |
| 4,871,607 | 10/1989 | Kuma et al. | 96/118 X |
| 5,057,128 | 10/1991 | Panzica et al. | 96/123 |
| 5,147,420 | 9/1992 | Claesson | 95/113 |
| 5,158,582 | 10/1992 | Onitsuka et al. | 95/113 X |
| 5,169,414 | 12/1992 | Panzica et al. | 95/113 |
| 5,194,154 | 3/1993 | Moyer et al. | 55/523 X |
| 5,230,719 | 7/1993 | Berner et al. | 95/123 X |
| 5,512,083 | 4/1996 | Dunne | 95/113 |
| 5,547,640 | 8/1996 | Kim | 95/113 X |

FOREIGN PATENT DOCUMENTS

| | | | |
|---|---|---|---|
| 55-142522 | 11/1980 | Japan | 96/118 |
| 59-100324 | 6/1984 | Japan | 96/125 |
| 01-099630 | 4/1989 | Japan | 95/113 |
| 05-023529 | 2/1993 | Japan | 96/154 |

*Primary Examiner*—Robert Spitzer

[57] ABSTRACT

A moisture removing device comprising a ceramic shell. The ceramic shell has a plurality of parallel openings. The openings extend along the length of the shell. The openings form elongated surfaces adapted to be contacted by moisture ladened air moving through the openings along a path of travel. Such surfaces have desiccant capabilities for the extraction of moisture from air passed therethrough.

15 Claims, 6 Drawing Sheets

FIG. 12a  MOLD
FIG. 12b  EXTRUDED

FIG. 13a
FIG. 13b  CORRUGATED

FIG. 14  LAMINATED

FIG. 15a  FIG. 15b
MOLDED

FIG. 16a

ROLL MOLDED

CERAMIC DESICCANT DEVICE

BACKGROUND OF THE INVENTION

1. Field of the Invention

The present invention relates to a ceramic desiccant device and, more particularly, pertains to removing moisture from a flow of gas such as air.

2. Description of the Prior Art

The use of desiccant devices of various designs and configurations are known in the prior art. More specifically, desiccant devices of various designs and configurations heretofore devised and utilized for the purpose of removing moisture from air through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 4,398,927 to Asher et al., discloses a cyclic adsorption process.

U.S. Pat. No. 4,595,403 to Sago et al., discloses a heat exchange element.

In this respect, the ceramic desiccant device according to the present invention substantially departs from the conventional concepts and designs of the prior art, and in so doing provides an apparatus primarily developed for the purpose of removing moisture from a flow of gas such as air.

Therefore, it can be appreciated that there exists a continuing need for new and improved ceramic desiccant device which can be used for removing moisture from a flow of gas such as air. In this regard, the present invention substantially fulfills this need.

SUMMARY OF THE INVENTION

In view of the foregoing disadvantages inherent in the known types of desiccant devices of various designs and configurations now present in the prior art, the present invention provides an improved ceramic desiccant device. As such, the general purpose of the present invention, which will be described subsequently in greater detail, is to provide a new and improved ceramic desiccant device apparatus and method which has all the advantages of the prior art and none of the disadvantages.

To attain this, the present invention essentially comprises a ceramic rotor to be used as a media to dry gasses comprising, in combination, a housing. The housing has an input area with a first path of travel for receiving moisture ladened air to be dried and an output area with a second path of travel in a direction opposite from the first path of travel for removing moisture from partially dried air with a turn-around zone to direct air from the first path of travel to the second path of travel. The turnaround zone is located in the housing remote from the input area and the output area. The housing has baffles to separate the first path of travel from the second path of travel. A cylindrically shaped shell is positioned within the housing and has an axis in the plane of the baffles. A plurality of openings extend along the length of the shell. The openings provide elongated surfaces adapted to be contacted by moisture ladened air moving in the first path of travel and partially ladened with moisture moving in the second path of travel. Such surfaces have desiccant capabilities for the extraction of moisture from air passed therethrough. Drive means are provided to rotate the shell about its axis to sequentially move different portions of the cylindrical shell and its openings between the first path of travel and the second path of travel. A heater is also provided and is located between the shell and input area within the first path of travel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ceramic desiccant device which has all the advantages of the prior art desiccant devices of various designs and configurations and none of the disadvantages.

It is another object of the present invention to provide a new and improved ceramic desiccant device which may be easily and efficiently manufactured and marketed.

It is a further object of the present invention to provide a new and improved ceramic desiccant device which is of a durable and reliable construction.

An even further object of the present invention is to provide a new and improved ceramic desiccant device which is susceptible of a low cost of manufacture with regard to both materials and labor, and which accordingly is then susceptible of low prices of sale to the consuming public, thereby making such desiccant devices of various designs and configurations economically available to the buying public.

Still another object of the present invention is to remove moisture from a flow of gas such as air.

Lastly, it is an object of the present invention to provide a new and improved moisture removing device comprising a ceramic shell. The ceramic shell has a plurality of parallel openings. The openings extend along the length of the shell. The openings form elongated surfaces adapted to be contacted by moisture ladened air moving through the openings along a path of travel. Such surfaces have desiccant capabilities for the extraction of moisture from air passed therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
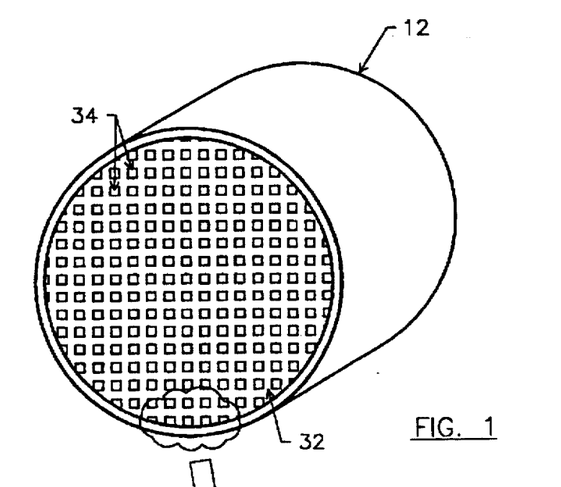
FIG. 1 is a perspective illustration of the preferred embodiment of the ceramic desiccant device constructed in accordance with the principles of the present invention.

With reference now to the drawings, and in particular to FIG. 1 thereof, a new and improved ceramic desiccant device embodying the principles and concepts of the present invention and generally designated by the reference numeral 10 will be described.

The present invention, the new and improved ceramic desiccant device, is comprised of a plurality of components. Such components in their broadest context include a housing, a cylindrically shaped shell, drive means and a heater. Such components are individually configured and correlated with respect to each other so as to attain the desired objective.

The present invention is a system 10 which includes a ceramic rotor 12. The ceramic rotor is used as a media to dry gasses. The ceramic rotor is provided with a housing 14. The housing is preferably of a rectangular configuration and has an input area 16 with a first path of travel 18 for receiving moisture ladened air to be dried. The housing further includes an output area 20 with a second path of travel 22 in a direction opposite from the first path of travel. The output area is for removing moisture from partially dried air after entering the housing and reversing direction.

The output area also has a turnaround zone 24 to direct air from the first path of travel to the second path of travel. The turnaround zone is located in the housing remote from the input area and the output area. The housing further includes baffles 26, 28 to separate the first path of travel from the second path of travel.

Figure 2:
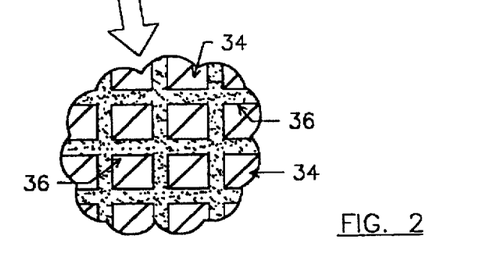
FIG. 2 is an enlarged perspective view of a portion of the desiccant device shown in FIG. 1.
Figure 3:
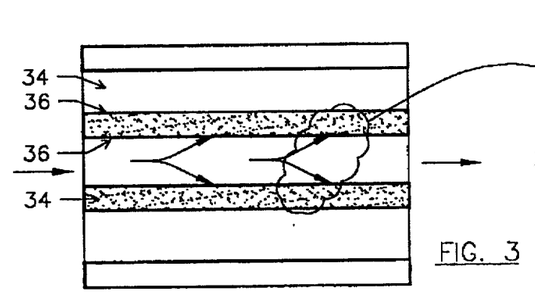
FIG. 3 is an enlarged cross sectional view of a portion of the desiccant device shown in FIGS. 1 and 2.

The next component of the system 10 is a cylindrically shaped shell 32. The shell is positioned within the housing and has an axis in the plane of the baffles. The shell is formed of a matrix of ceramic material with moisture absorbing particles dispersed therethrough. A plurality of essentially parallel openings or passageways 34 extend along the length of the shell. The openings provide elongated surfaces 36 and are adapted to be contacted by moisture ladened air which move in the first path of travel. Such surfaces are also adopted to be contacted by air partially ladened with moisture while moving in the second path of travel.

Figure 4:
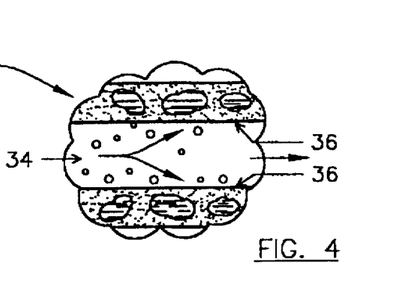
FIG. 4 is a further enlarged view of a portion of the device shown in FIG. 3.
Figure 5:
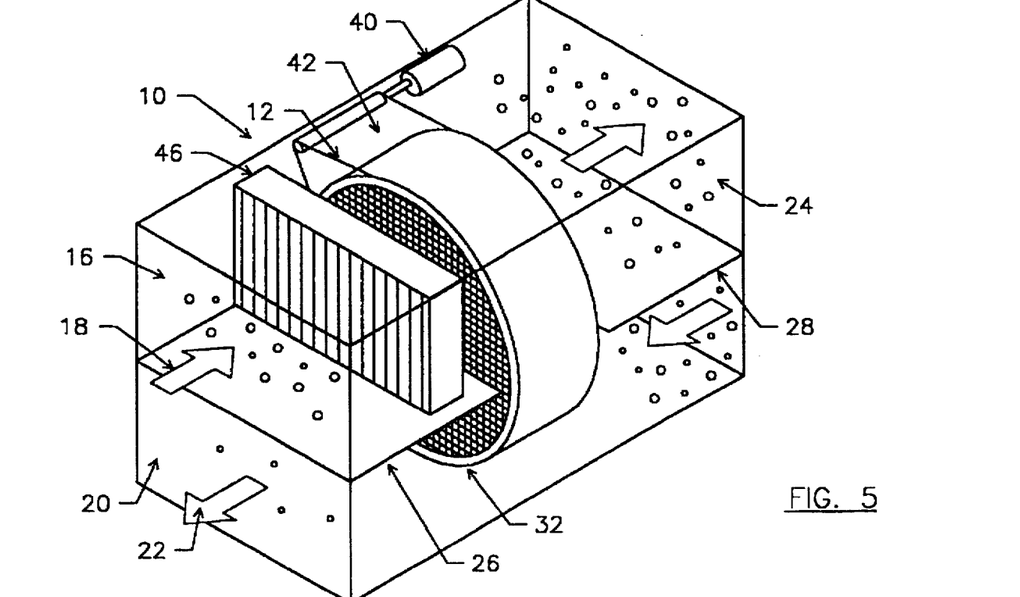
FIG. 5 is a perspective illustration of the ceramic desiccant device shown in FIG. 1 but illustrating it in a system configuration with air handling components.

Such surfaces 36 have desiccant capabilities for the extraction of moisture from air passed in contact therewith. The moisture absorbing particles are selected from the class of desiccant materials including zeolites, silica gel, activated alumina, titanium silicate, glycols, calcium chloride and lithium chloride and other hydrophilic materials.

The next major component of the system 10 is a motor or other drive means 40. The drive means functions to rotate the shell about its axis. Driving is through a belt 42. This functions to sequentially move different portions of the cylindrical shell and its openings between the first path of travel and the second path of travel in a continuous cycle of operation during use.

Another component of the system 10 is a heater 46. The heater is located between the shell and input area within the first path of travel. The heater functions to initially drive out moisture from the air entering the device and to raise the temperature of such air prior to contact with the desiccant for more efficient moisture removal.

Figure 6A:
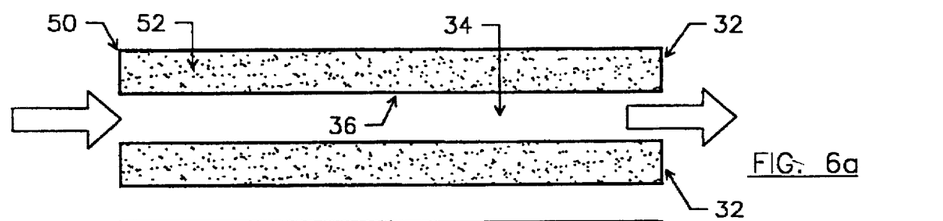
FIGS. 6A, 6B and 6C are enlarged cross sectional views illustrating alternate techniques for providing the desiccant material to the ceramic core of the device of the prior Figures.
Figure 6B:
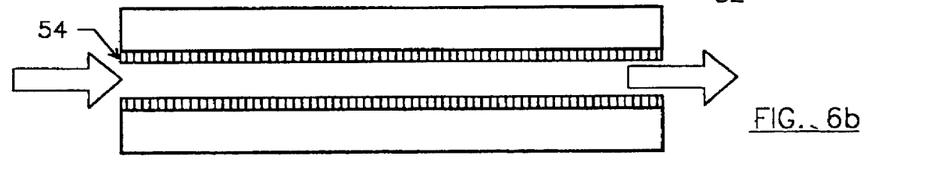
Figure 6C:
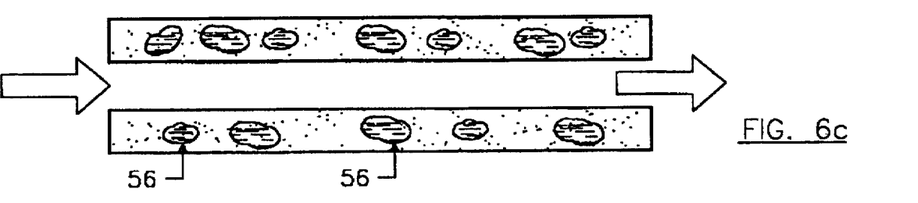

FIGS. 6A, 6B and 6C are enlarged showings of the openings 34 and surfaces 36 illustrating alternate embodiments of the invention. In FIG. 6A, the ceramic member 32 is fabricated of ceramic material 50, initially in paste form, with desiccant material 52, initially in powder form which is mixed together to form the final desiccant device. The preferred powder or particulant form of desiccant includes zeolites, silica gel, activated alumina and titanium silicate or another solid desiccant.

In the FIG. 6B embodiment, the ceramic device is first formed. It is then coated or bonded with a desiccant material 54, initially in powder form as by dipping or spraying.

The embodiment of FIG. 6C also begins with a preformed ceramic member as in FIG. 6B. Such member is preferably porous. Such member is then preferably sprayed or dipped in a liquid desiccant such as a glycol, calcium chloride and lithium chloride or another liquid desiccant. In the FIG. 6C embodiment, liquid particles 56 are shown. Such particles grow in and/or on the ceramic device as added moisture is absorbed from moisture ladened air.

Figure 7A:
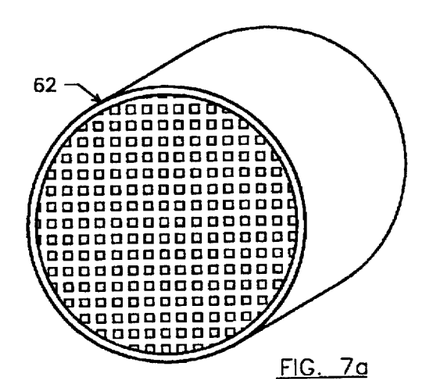
FIGS. 7A, 7B, 7C, 7D and 7E show alternate designs for the cross sectional configuration of the desiccant device shown in FIGS. 1 and 5.
Figure 7B:
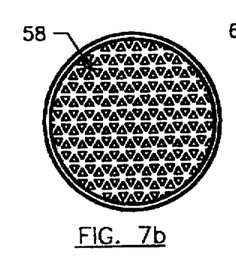
Figure 7C:
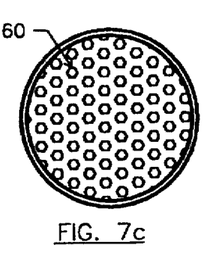
Figure 7D:
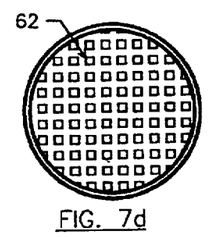
Figure 7E:
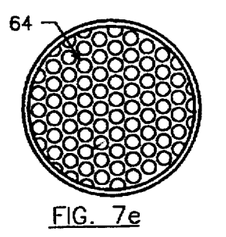

In an alternate embodiment as shown in FIG. 7B, the ceramic shell is in a cylindrical configuration and the openings therein are also cylindrical with the axes of the openings being parallel with the axis of the cylinder but with the openings 58 in a triangular cross sectional configuration. The openings may also have a cross section of a multi-faced polygon, a honeycombed configuration 60 as shown in FIG. 7C or a square cross sectional configuration 62 as shown in FIGS. 7A and 7D. The openings may further have a circular cross sectional configuration 64 as shown in FIG. 7E.

Figure 8A:
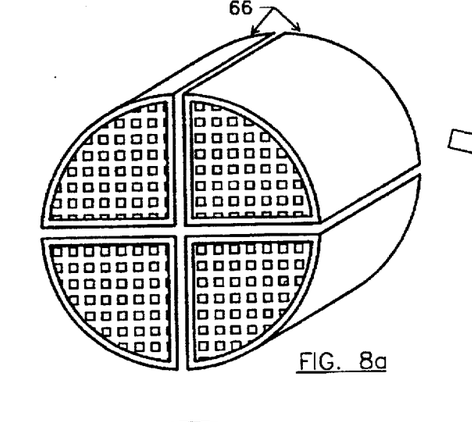
FIG. 8A is a perspective illustration of an alternate design illustrating the assembled condition of segments brought together to form a desiccant device similar in function to that shown in FIGS. 1, 5 and 7A.
Figure 8B:
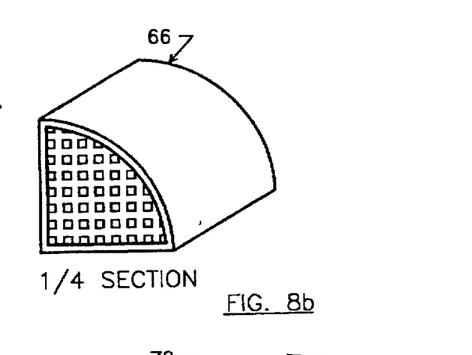
FIG. 8B is an enlarged perspective view of one of the segments shown in FIG. 8A.
Figure 9A:
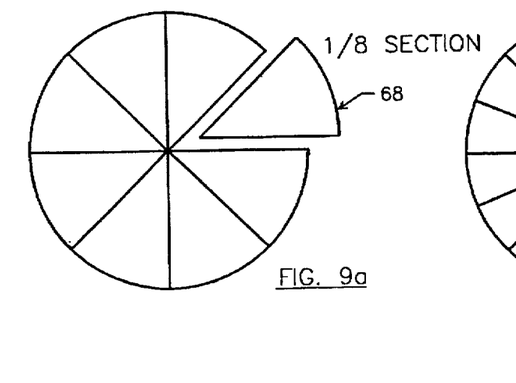
FIGS. 9A and 9B are further alternate constructions of a desiccant device similar to that shown in FIGS. 1, 5, 7A and 8A.

In an other alternate embodiment as shown in FIGS. 8A and 8B, the ceramic shell may be circular in cross sectional configuration and formed of a plurality of 90 degree wedges 66. FIG. 9A features eight 45 degree segments 68. The wedges have a pointed end adjacent to the axis of the cylinder a remote arcuate end.

Figure 9B:
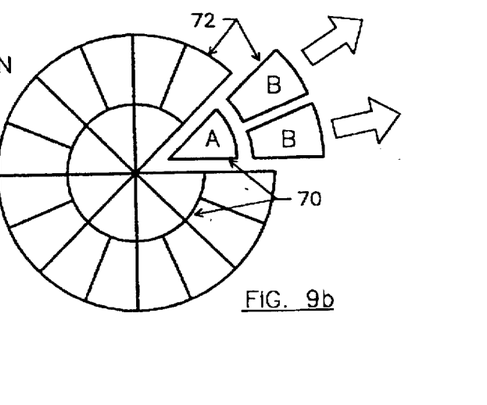

In the embodiment of FIG. 9B, each segment is formed of a plurality of interior wedge-shaped segments 70 and a plurality of exterior wedge-shaped segments 72. The radially interior edges of the exterior segments, like their exterior segments, are arcuate.

The ceramic shell 74 may be fabricated of a plurality of generally cube-shaped segments 76 in a ring-shaped configuration around the axis of the cylinder and with the openings 78 formed radially with respect to the axis of the cylinder. Note FIG. 10. A plurality of rings are located along the axis of the cylinder.

Figures 10, 11A, 11B, 11C:
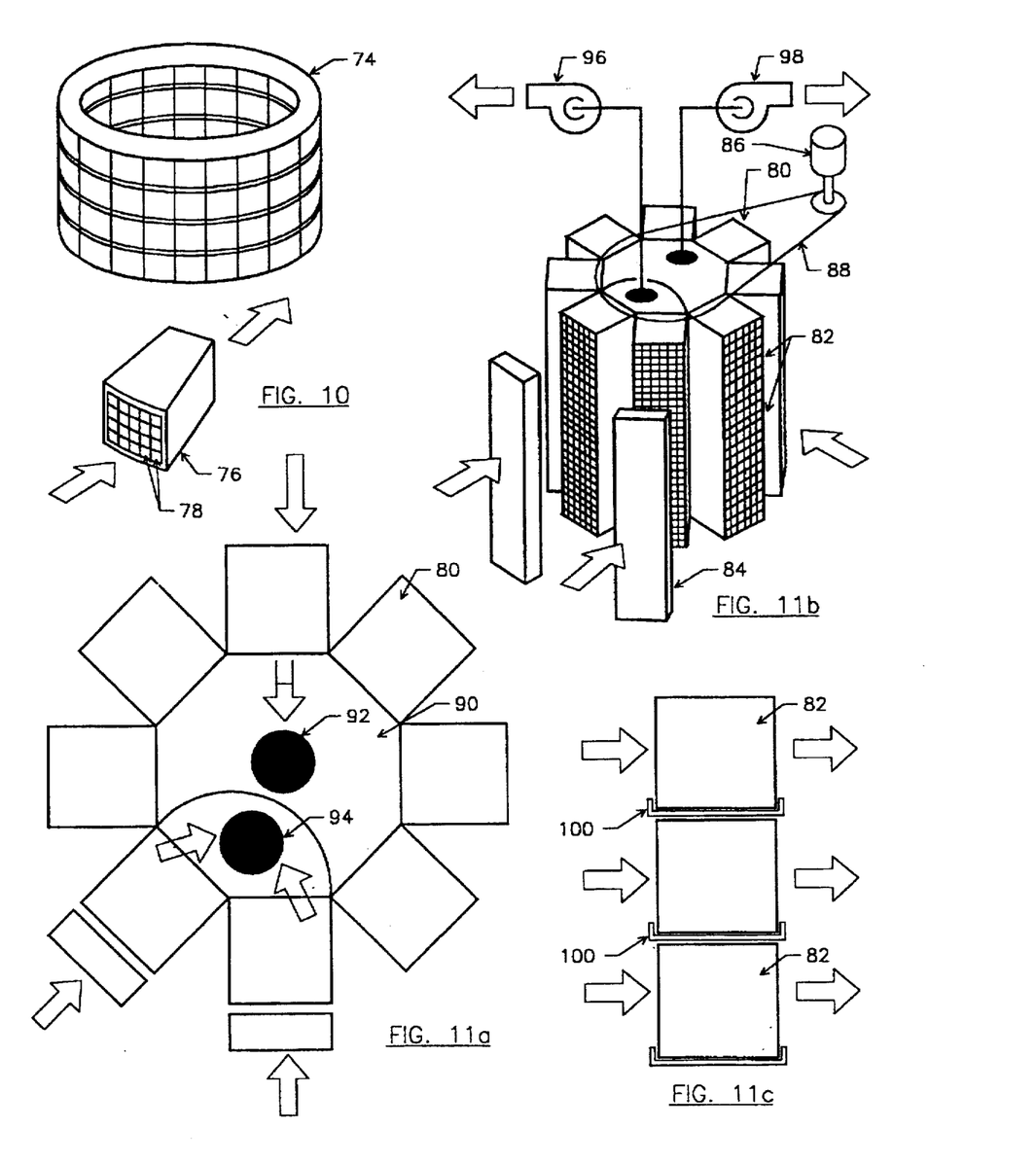
FIG. 10 is a further alternate design similar in function to that shown in FIGS. 1, 5, 7A, 8A and 9A.
FIGS. 11A, 11B and 11C show a yet further alternate embodiment for segments of a desiccant device arranged in a systems configuration.

In the embodiment of FIGS. 11A, 11B and 11C, the plural stacks 80 of desiccant devices move in a circular manner. Plural desiccant blocks 82 form each stack. A motor 86 rotates the device through a belt 88 in a step and repeat fashion. Fixed heaters 84 preheat the stacks 80 when positioned adjacent to each other. An air flow through the heaters and adjacent stacks will function to rejuvenate the desiccant surfaces of each stack. Air through the stacks remote from the heaters will process the air through moisture removal. A large chamber 90 interior of the blocks effects the flow of air being processed through aperture 92 by fan 98. Air from aperture 94 is fed by fan 96 for rejuvenation. A baffle 100 along the length of the space between the blocks separates the processed air from the rejuvenated air.

Figure 12A:
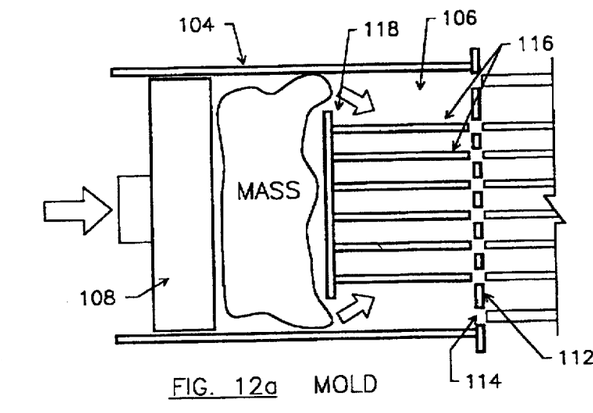
FIGS. 12A and 12B illustrate a method of extruding a desiccant device of the prior Figures.
Figure 12B:
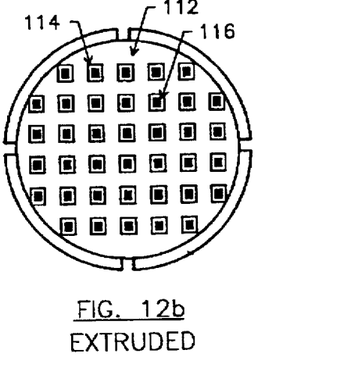

Also provided with the system 10 of the present invention is a method of fabricating the ceramic desiccant device. In the primary embodiment as shown in FIGS. 12A and 12B, such fabricating steps include providing a mass of formable ceramic material. The material is then provided in an extrusion device 104. An extrusion head 108 is then provided with a cavity 106 of the device to move the material from the extrusion device. A die 112 is next provided on the extrusion device at the output end thereof for the passage of ceramic material therethrough and its shaping. The die has apertures 114 therethrough. Such apertures correspond to the intended cross sectional shape of the ceramic device. Next provided within the cavity is an interference member between the head and the die with elongated members 116 aligned with the apertures of the die. A base 118 is secured within the cavity through supports. The head is then moved toward the die to force the mass of ceramic material through the apertures of the die to fabricate the ceramic device.

Figure 13A:
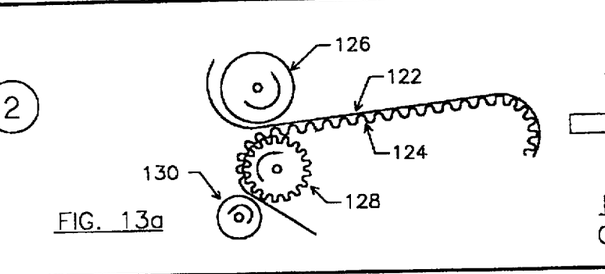
FIGS. 13A and 13B illustrate another method of fabricating a desiccant device of the prior Figures through corrugation.
Figure 13B:
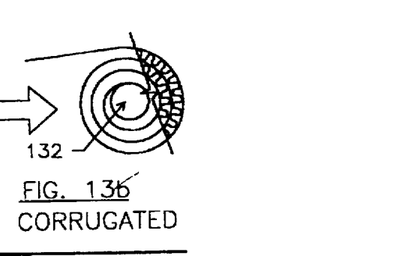

A next method to fabricate the ceramic device in a cylindrical configuration with parallel cylindrical openings therethrough is shown in FIGS. 13A and 13B. A first supply 126 of ceramic material 122 is provided in sheet form. A second supply 130 of ceramic material 124 is also provided in sheet form. The first supply of ceramic material is then fed from an input to an output at the finished ceramic device. The second supply of ceramic material is then fed from an input to an output end to an intermediate region in moving contact with the first sheet material for coupling contact therebetween. Corrugations to the second sheet material is provided by axial projections 128 on the exterior surface of a feed roll whereby openings for the ceramic device are formed between the first and second sheets of ceramic material. The composite sheet material is then fed onto a rotating core 132 to form the ceramic device.

Figure 14:
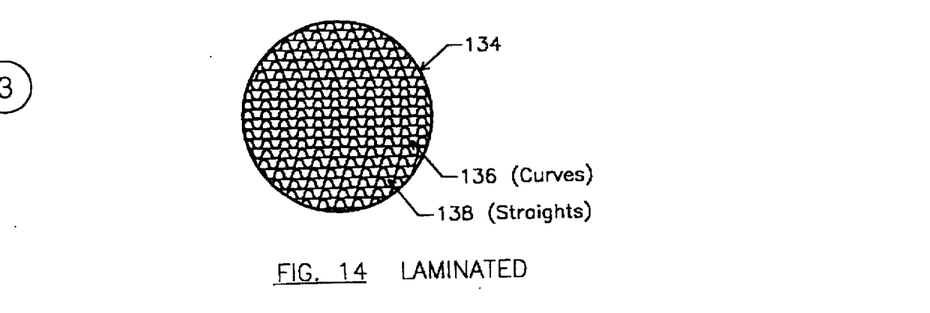
FIG. 14 illustrates an alternate embodiment for fabricating a desiccant device of the prior Figures through lamination.

FIG. 14 shows a ceramic device 134 wherein the output of the FIG. 13A embodiment is not fed onto a roll. Rather, the first planar sheet material 138 and the second corrugated sheet material 136 are bonded and then cut into sheets and the sheets are stacked to form the final cylindrical ceramic device.

Figures 15A, 15B:
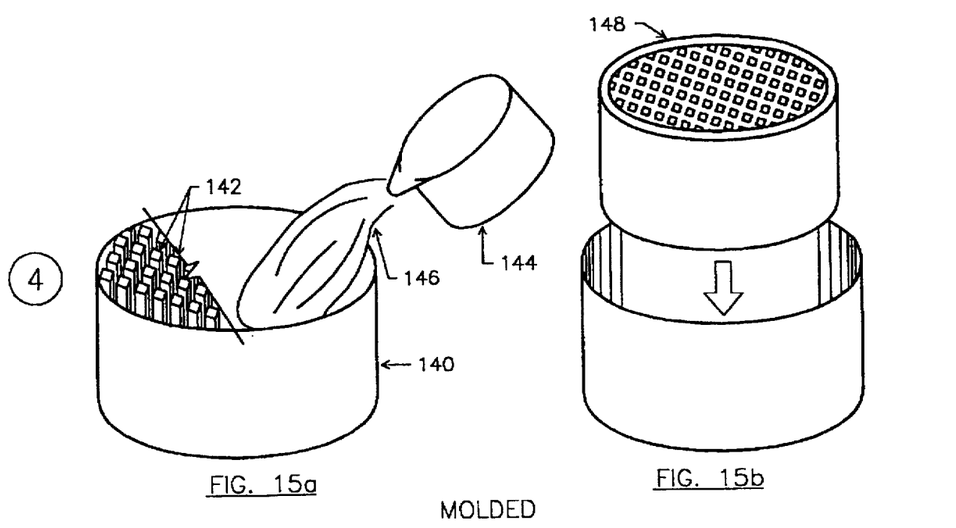
FIGS. 15A and 15B illustrate an alternate embodiment for fabricating a desiccant device of the prior Figures through molding.

In an alternate embodiment a mold 140 with a cylindrical side wall, a bottom wall and an opened top is provided. Upstanding projections 142 with lower ends are coupled with respect to the upper surface of the bottom wall and with its upper ends in a common plane coextensive with the upper open top of the mold. A fluid ceramic material 146 is then poured from a supply 144 into the mold. The ceramic material is then allowed to harden and the hardened ceramic material is then removed from the mold to form a final ceramic device 148. Note FIGS. 15A and 15B.

Figures 16A, 16B:
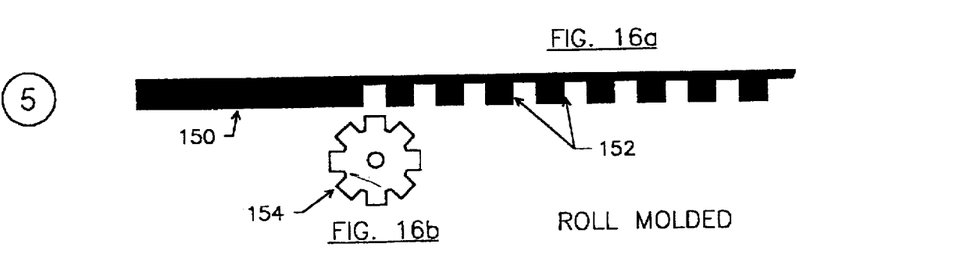
FIGS. 16A, 16B and 16C illustrate yet a further alternate embodiment for fabricating a desiccant device of the prior Figures through roll molding.
Figure 16C:
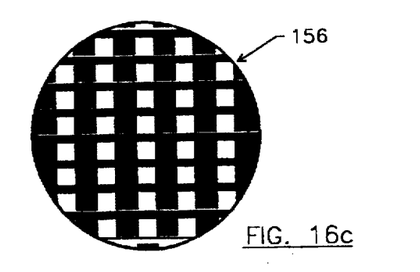

A thick sheet of moldable ceramic material 150 is provided in the embodiment of FIGS. 16A, 16B and 16C. Next, a wheel 154 with radial fingers parallel with the axis of the roll is then provided. The ceramic material is then moved in a path of travel in contact with the wheel and with the wheel rotating at a common speed with respect to the feed of the sheet material. This transforms the planar sheet material into sheet material with teeth 152 corresponding to the fingers of the roll. The sheet material is then cut into segments. The cut sheet material is then stacked into an array to form the final cylindrical ceramic device 156.

The objective of the present invention is the extension of the use of ceramic material to desiccant technology. The invention contemplates the use of ceramic material formed with pores that can contain desiccant liquids, or ceramic material which contains a mixture of solid desiccants with moisture removal by absorption or adsorption, or ceramic material formed as cores which have small openings or flutes that when the air goes across it will dry by absorption of vapors.

The ceramic cores can be in the form of wheels that rotate very slowly or could be in the form of cubes that can be built as an enlarged cylinder or it could be used in a multi-path by using air dampers.

The present invention could be manufactured five different ways: (1) By extruded cores produced with dies that push through ceramic material that normally could be corderite or similar. This makes long cylinders that have constant openings or flutes; (2) Corrugated as the same process to manufacture corrugated cardboard. This is effected by making a composite of two plates, one of the plates will be wavered or zig-zaged while the other will be flat. The ones in rotation will be bonded or integrated together in a core wheel; (3) By lamination, for example, by producing plates with flutes that can be stacked one on top of another with cutting before or after the stacking to form or post form it to the shape desired;

(4) Molding the ceramic cores. This means having a mold and applying the liquid ceramic, very fluid, after it is dry, take it out and sent to the oven to be cooked; and (5) Roll molding strips of ceramic material with parallel projections and recesses and then cutting and stacking the roll molded strips.

The desiccants can be applied to the ceramic rotor in different ways. It can be integrated with the ceramic mixture before it is cooked. Solid desiccants can be used like zeolites, silica gel, activated alumina, or titanium silicate or another hydrophilic material. These components can be mixed with the ceramic material or the ceramic mix. The second application is manufacturing ceramics at a very high porosity mass and to apply any kind of liquid desiccant like glycols, calcium chloride or lithium chloride or other liquid desiccant. The advantage of this process is that it enables to change or replace the desiccant when needed. The third manner in which to apply the desiccants could be manufacturing the cores with parallel openings or flutes and after that gluing or bonding the solid desiccants thereto after the ceramic material is shaped and cooked. This is similar to the process of manufacturing enthalpy wheels.

Ceramics is low cost and relatively heavy material that can be controlled and can have a low thermal mass. It is an electrical and thermal insulator and has less heat carried over than other heat exchangers. This reduces the gain of heat in the process path from the regeneration path. Another advantage is controllable porosity. In this manner, the size of the pore can control the function of the additive that we apply to the ceramic.

The density of the porosity in the solid materials can be changed and the density of the flutes can be easily changed. Ceramic can resist very high temperatures with very low deformation, the contraction and dilatation are very small.

The air pattern can be perfectly controlled within a very small area, a very low pressure drop compared to the regular corrugation process. It can have a humongous surface area depending on the geometrical design.

Ceramic rotors can be applied in square cells, wave cells, triangular cells or roundfill cells.

The material of the core is corrosion resistant and has a chemical stability and chemical durability. It is an inert material and thus not reactive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved ceramic rotor to be used as a media to dry gasses comprising, in combination:

a housing having an input area with a first path of travel for receiving moisture-ladened air to be dried and an output area with a second path of travel in a direction opposite from the first path of travel for removing moisture from air partially ladened with moisture with a turnaround zone to direct air from the first path of travel to the second path of travel, the turnaround zone being located in the housing remote from the input area and the output area, the housing having baffles to separate the first path of travel from the second path of travel;

a cylindrically shaped shell positioned within the housing having an axis in the plane of the baffles, a plurality of openings extending along the length of the shell, the openings providing elongated surfaces adapted to be contacted by moisture ladened air moving in the first path of travel and by air partially ladened with moisture moving in the second path of travel, such surfaces having desiccant capabilities for the extraction of moisture from air passed therethrough;

drive means to rotate the shell about its axis to sequentially move different portions of the cylindrical shell and its openings between the first path of travel and the second path of travel; and a heater located between the shell and input area within the first path of travel.

2. A moisture removing device comprising:

an extruded ceramic shell having a plurality of essentially parallel similarly shaped openings extending along the length of the shell, the openings forming elongated surfaces adapted to be contacted by moisture ladened air moving through the openings along a path of travel, such surfaces having moisture absorbing means with desiccant capabilities for the extraction of moisture from air passed therethrough; and a housing receiving and supporting the shell, the housing an input area with a first path of travel including some of the openings for receiving moisture-laden air to be dried and an output area with a second path of travel including others of the openings, the second path of travel being in a direction opposite from the first path of travel for removing moisture from air partially ladened with moisture with a turnaround zone to direct air from the first path of travel to the second path of travel, the turnaround zone being located in the housing remote from the input area and the output area.

3. The device as set forth in claim 2 wherein the shell is formed of a matrix of ceramic material with moisture absorbing particles.

4. The device as set forth in claim 3 wherein the moisture absorbing particles are in powder form dispersed throughout the ceramic material and are selected from the class of materials including zeolites, silica gel, activated alumina and titanium silicate or another solid desiccant.

5. The device as set forth in claim 2 wherein the moisture absorbing means are in liquid form bonded to the surface of the ceramic material and selected from the class of moisture absorbing material including glycols, calcium chloride and lithium chloride or another liquid desiccant.

6. The device as set forth in claim 2 wherein the ceramic shell is in a cylindrical configuration and the openings therein are also cylindrical with the axes of the openings being parallel with the axis of the cylinder.

7. The device as set forth in claim 6 wherein the openings have a triangular cross sectional configuration.

8. The device as set forth in claim 6 wherein the openings have a cross section of a honeycombed configuration.

9. The device as set forth in claim 6 wherein the openings have a square cross sectional configuration.

10. The device as set forth in claim 6 wherein the openings have a circular cross sectional configuration.

11. The device as set forth in claim 2 wherein the ceramic shell is circular in cross sectional configuration and formed of a plurality of wedge-shaped segments, each segment having a pointed end adjacent to the axis of the cylinder and having a remote arcuate end.

12. The device as set forth in claim 11 wherein each segment is formed of a wedge-shaped interior segment and a plurality of wedge-shaped exterior segments, the radially interior edges of the exterior segments being arcuate.

13. The device as set forth in claim 2 wherein the ceramic shell is fabricated of a plurality of generally cube-shaped segments ring-shaped configuration forming a cylinder an axis and with the openings formed radially with respect to the axis of the cylinder.

14. The device as set forth in claim 13 and further including fixed trays to support the segments with respect to each other.

15. The device as set forth in claim 13 and further including blowers to effect a flow of air from a region remote from the ceramic shell to the openings of the ceramic shell.

* * * * *